United States Patent [19]

Takahashi et al.

[11] Patent Number: 4,688,116
[45] Date of Patent: Aug. 18, 1987

[54] APPARATUS FOR RECORDING AND/OR REPRODUCING DIGITAL SIGNAL

[75] Inventors: Toshihiko Takahashi, Chiba; Hirohito Kawada, Tokyo, both of Japan

[73] Assignee: Sony Corporation, Tokyo, Japan

[21] Appl. No.: 858,023

[22] Filed: May 1, 1986

[30] Foreign Application Priority Data

May 29, 1985 [JP] Japan ................................ 60-116213

[51] Int. Cl.⁴ ...................... G11B 15/06; G11B 23/36; G11B 27/28
[52] U.S. Cl. .................................................. 360/72.2
[58] Field of Search ........................ 360/72.2, 73, 74.4

Primary Examiner—George G. Stellar
Attorney, Agent, or Firm—Lewis H. Eslinger; Alvin Sinderbrand

[57] ABSTRACT

An apparatus for recording and/or reproducing a digital signal on a recording medium having at least a program start signal and program information recorded thereon, further records an identifying code signal indicating the start of unnecessary information on the recording medium during a predetermined time period, and, in a playback mode, when such identifying code signal is detected, the recording medium is transported at high speed and, when a program start signal is next detected, the recording medium is again transported at a normal speed.

3 Claims, 9 Drawing Figures

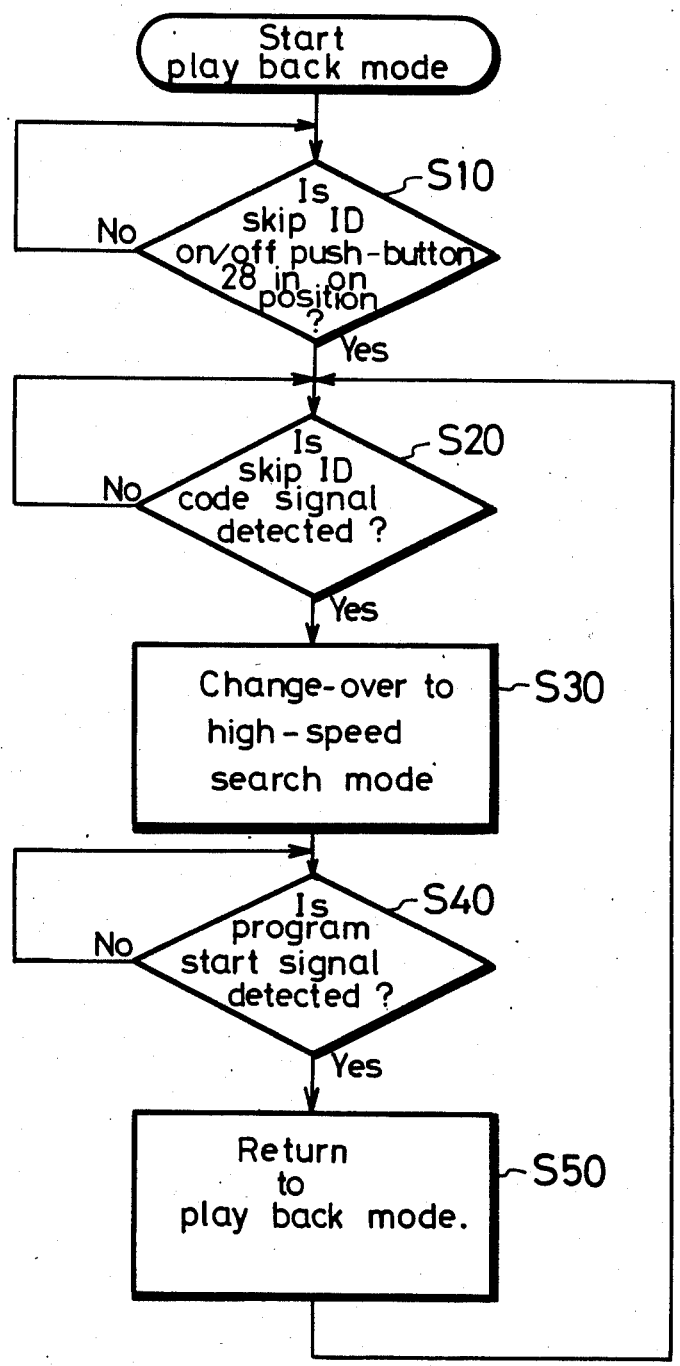

APPARATUS FOR RECORDING AND/OR REPRODUCING DIGITAL SIGNAL

BACKGROUND OF THE INVENTION

1. Field of the Invention

This invention relates generally to apparatus for recording and/or reproducing a digital signal and more particularly to an apparatus for recording and/or reproducing a digital signal in a so-called digital audio tape recorder and the like.

2. Description of the Prior Art

So-called digital audio tape recorders (DAT) that are now under development are of the fixed or stationary head type (S-DAT) or of the rotary head type (R-DAT). In the stationary head type digital audio tape recorder, a digital audio signal is recorded in many tracks parallel to the longitudinal direction of a tape by using a multi-track stationary head. In the rotary head type digital audio tape recorder, a digital audio signal is recorded in tracks skewed relative to the longitudinal direction of the tape by rotary heads of the helical scanning system.

FIG. 1 shows a tape format used in the above mentioned rotary head type digital audio tape recorder. Examples of various dimensions in FIG. 1 will be indicated below.

| A | tape width | 3.81 mm |
| W | effective recording width | 2.61 mm |
| Vt | tape speed | 7.20 mm/s |
| L | track length | 23.5 mm |
| P | track pitch | 12.0 μm |
| θ | track angle | 6° 22' |
| α | azimuth angle of head gaps | ±20° |

In a recorder for use with the above defined tape format, a rotary head drum about which the tape is wrapped has a diameter of 30 mm and is rotated at a speed of 2000 rpm, by way of example. Further, the recording speed (Vh in FIG. 1) is selected to be 3.13 mm/s and the tape wrapping angle is selected to be 90°.

If, for example, music is recorded by the rotary head type digital audio tape recorder, the recording is carried out in accordance with a track format and a block format shown in FIG. 2 and FIGS. 3A and 3B, respectively. At such time, positional information, such as, a program number, a track number, a time code (code indicating the time, in minutes and seconds, from the starting point of the program) and the like, and sub-codes containing other necessary auxiliary data are also recorded.

As FIG. 2 shows that one track, which is recorded by one rotary head, is formed of 196 blocks, in which a PCM (pulse code modulated) audio data recording area comprised of 128 blocks is substantially centered in respect to the length of the track. An ATF (automatic track following) area comprised of 5 blocks and in which a pilot signal for the tracking operation is recorded is provided at opposite sides of the PCM audio data recording area, and sub-code areas 1 and 2 each comprised of 8 blocks for recording sub-code data are provided outside the ATF areas.

The PCM area and the sub-code areas 1 and 2 are provided with respective PLL (phase locked loop) areas of 2 blocks each for synchronization. GAP areas of 3 blocks each are provided between the PCM area and the ATF areas and between the latter and the sub-code areas 1 and 2. If the timing for switching the recording mode and the playback mode is matched with the gap areas between the PCM area and the sub-code areas 1 and 2, it becomes possible to independently record the PCM audio signal or the sub-code signal. The track format of FIG. 2 is completed by margin areas of 11 blocks at the opposite ends of the track and by post amble areas of 1 block situated between sub-code area 1 and the adjacent GAP and between sub-code area 2 and the adjacent margin area. The numerals on FIG. 2 will be seen to indicate the numbers of blocks that constitute the respective areas.

As shown in FIG. 3A, each block is formed of 288 bits and includes an 8-bit block synchronizing signal, an 8-bit identifying code (hereinafter simply referred to as ID code), an 8-bit block address code, an 8-bit parity code and 256-bit data (PCM data or sub-code data) which are sequentially located in the order given. The MSB (most significant bit) of the block address code is assigned "0" in each block containing PCM data and "1" in each block containing sub-code data as shown in FIG. 3B.

The ID code in each block containing PCM data is used to indicate the use of audio data, emphasis characteristic, quantization characteristic, sampling frequency, the number of channels, the presence or absence of editing of the PCM audio signal and the like. In each block containing sub-code data, the presence or absence of editing of the sub-code data, a recording start point (head) of the recorded program, interval to be skipped in the playback mode and so on are assigned to the MSB, 2SB (second significant bit), 3SB (third significant bit), ..., of the 8-bit ID code, respectively.

At the start portion of each program, the 2SB of the ID code in a block containing sub-code data becomes "1" for 10 seconds and is used as a program start signal. The 2SB of the ID code in a block containing sub-code data is recorded as "0" in portions other than the start portion of each program.

Further, the interval on the tape in which the 3SB of the ID code in a block containing sub-code data becomes "0" is normally reproduced in the playback mode, whereas, in the interval in which the 3SB of the ID code of each such block becomes "1", the program recorded in that interval is considered to be unnecessary and is skipped in the playback mode. Such 3SB of the ID code is referred to as a "skip bit" hereinafter.

When a program, for example, music recorded on the magnetic tape, is reproduced and listened to, there may be a non-recorded (blank) portion on the tape or a portion in which unnecessary information is recorded. In that case, it is desirable that the blank portion or unnecessary information be skipped and that the music be reproduced and listened to without intermission.

In order to skip the blank portion, it is sufficient that the blank state or interval be detected by sensing the level of the reproduced audio signal, and when this blank state or interval lasts, for example, more than 10 seconds, the magnetic tape is transported at a high speed, for example, 16 times the normal tape speed.

Alternatively, in order to skip the tape portion containing unnecessary information, it has been the practice, by way of example, to continuously record the above-mentioned skip bit of the sub-code along the entire interval on the magnetic tape to be skipped, as indicated at (SKIP ID) on FIG. 4. When this skip mark (SKIP ID) is detected in the playback mode, the magnetic tape is transported at the high tape speed, for example, 16 times as high as the normal tape speed.

However, in the case of the conventional system in which the skip bit is continuously recorded along the interval of the magnetic tape which is to be skipped, only the interval in which the skip bit exists is skipped so that the skip interval is cleared. When the skip bit is recorded on the sub-code area in the so-called after-recording mode, an after-recording time corresponding to the time interval to be skipped is required. In other words, if there is a portion of the recorded program to be skipped which continues for a substantial period, for example, 3 minutes, it is necessary that the start thereof be specified at a certain point, the end thereof be specified at a different point, and the interval between the start and end points be recorded in the after-recording mode for 3 minutes to record the skip bit therealong. Further, when the recorded skip bit is to be erased, the same time period is required.

OBJECTS AND SUMMARY OF THE INVENTION

Accordingly, it is an object of this invention to provide an improved apparatus for recording and/or reproducing a digital signal.

It is another object of this invention to provide an apparatus for recording and/or reproducing a digital signal which can considerably reduce the time required to record or erase a skip bit or identifying code signal indicating unnecessary information.

It is a further object of this invention to provide an apparatus for recording and/or reproducing a digital signal which is particularly suited for use as a so-called digital audio tape recorder.

According to an aspect of the present invention, an apparatus for recording and/or reproducing a digital signal comprises a recording medium on which at least a program information signal and a program start signal indicating the start of the program information signal are recorded, and means for recording a skip identifying code signal, that is, a skip bit, only at a start portion of unnecessary program information on the recording medium. Thereafter, until the next program start signal is detected, the recording medium is transported at an arbitrary high speed. In the playback mode, when the skip identifying code signal is detected, the recording medium is transported at high speed until the next program start signal is detected, whereupon the recording medium is transported at the normal speed.

The above, and other objects, features and advantages of the present invention, will become apparent from the following detailed description of a preferred embodiment taken in conjunction with the accompanying drawings, throughout which the same reference numerals are used to designate like elements and parts.

BRIEF DESCRIPTION OF THE DRAWINGS

FIG. 8 is a flow chart used to explain the operation of the apparatus of FIG. 6 in reproducing a skip identifying code from a recording medium in a playback mode of the apparatus.

DESCRIPTION OF THE PREFERRED EMBODIMENT

An apparatus for recording and/or reproducing a digital signal apparatus according to an embodiment of this invention will hereinafter be described with reference to the attached drawings.

Figure 1:
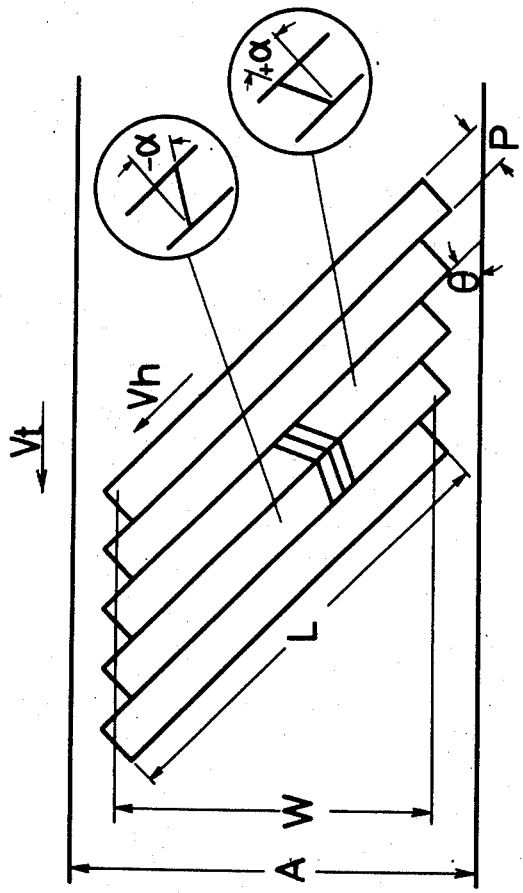
FIG. 1 is a diagrammatical representation of an example of a prior art tape format of a rotary head type digital audio tape recorder.
Figure 2:
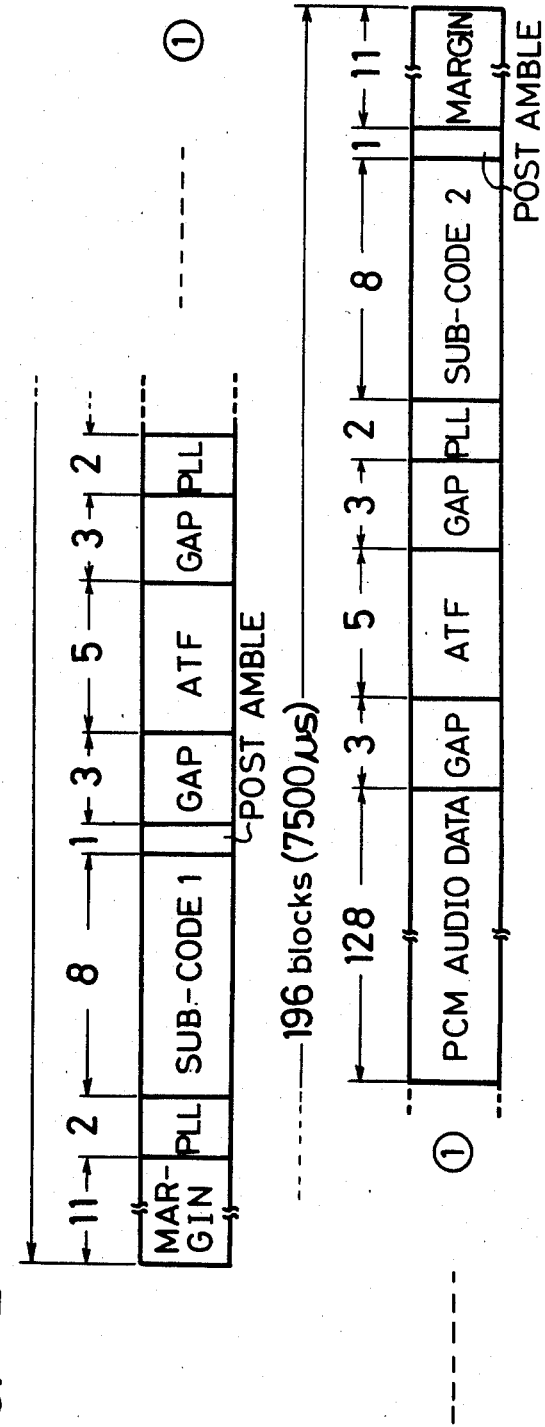
FIG. 2 is a diagrammatic representation showing an example of a prior art track format of a rotary head type digital audio tape recorder.
Figure 3A:
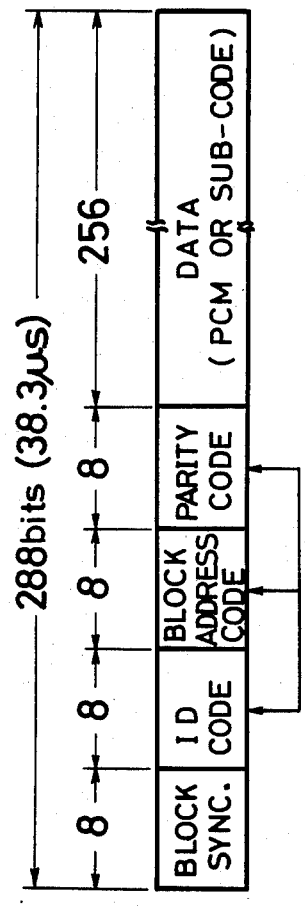
FIG. 3A is a diagrammatic representation of a prior art block format of a rotary head type digital audio tape recorder.
Figure 3B:
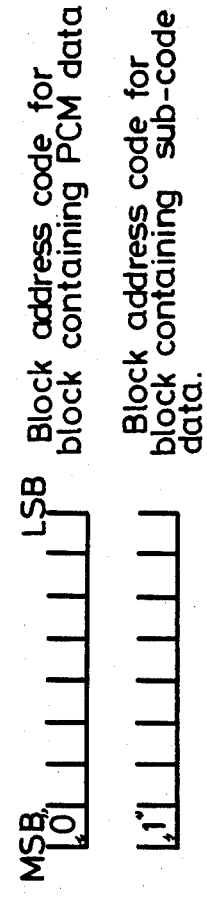
FIG. 3B is a diagrammatical representation of address codes used in such prior art block format.
Figure 5:
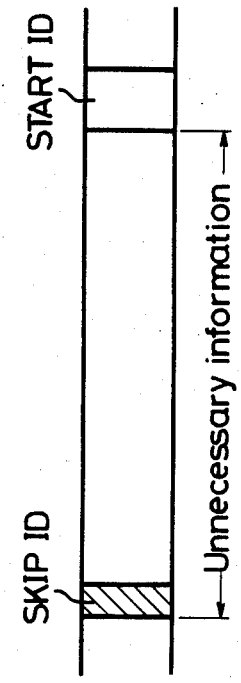
FIG. 5 is a diagrammatical representation used to explain a fundamental principle of this invention.
Figure 4:
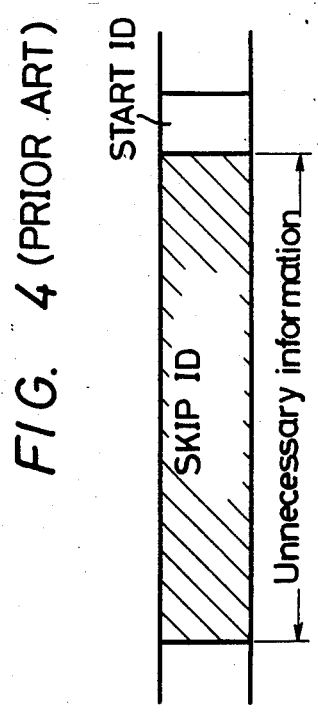
FIG. 4 is a diagrammatical representation of the recording of a skip ID in an example of a prior art rotary head type digital audio tape recorder.

However, initially, a fundamental principle of this invention will be described with reference to FIG. 5. In accordance with this invention, as shown on FIG. 5, in the so-called after-recording mode, a skip identifying code signal (SKIP ID) relating to unnecessary information is recorded only at the start end portion of the unnecessary information during a short time period, for example, corresponding to at least 2 tracks. The end or terminal portion of the unnecessary information is indicated by the start end portion of the succeeding program start signal (START ID) that was previously recorded on the recording medium. The skip identifying code signal (SKIP ID) is recorded in the after-recording mode and, for the duration of the unnecessary information portion, the recording medium is transported at an arbitrary high speed at which the succeeding program start signal can still be detected. When the next program start signal (START ID) is detected, the apparatus is returned to the playback mode.

In the playback mode, when the skip identifying code signal (SKIP ID) is detected, the apparatus is changed-over to the high speed (fast-forward) search mode and the unnecessary information is skipped until the next program start signal is detected and then the apparatus is returned to the playback mode.

Since according to the present invention as described above, in the after-recording mode, the skip identifying code signal (SKIP ID) is recorded only at the start end portion of the unnecessary information for a short time period and the recording medium is then transported at the arbitrary high speed until the succeeding program start signal is detected, it is not necessary to record the skip identifying code signal (SKIP ID) over the whole interval of the unnecessary information. Therefore, unlike the prior art, the time necessary for recording the skip identifying code signal (SKIP ID) can be reduced considerably. Further, when the recorded skip identifying code signal (SKIP ID) is to be erased, such code can be erased in a quite short time period.

Figure 6:
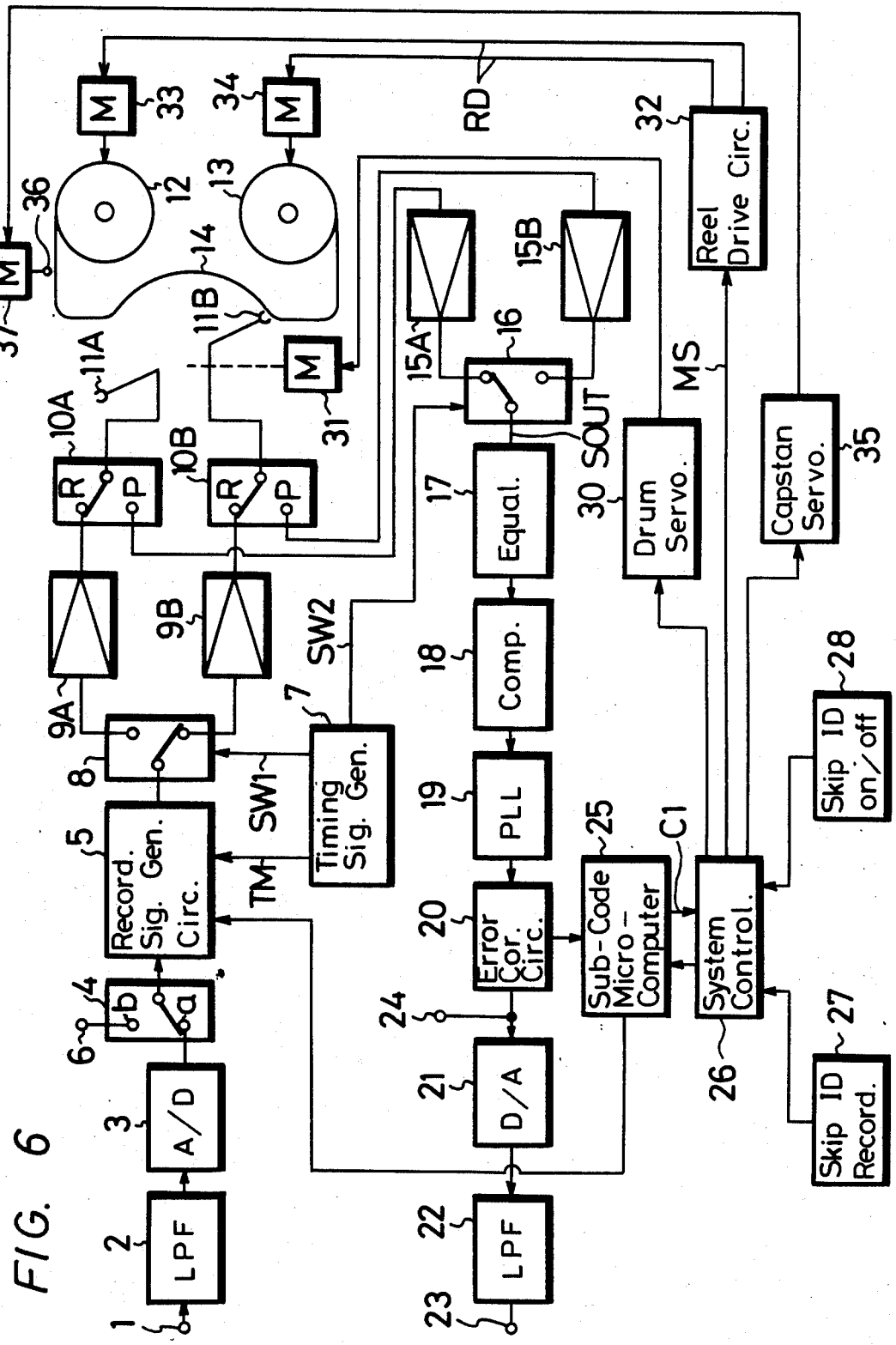
FIG. 6 is a block diagram showing an embodiment of an apparatus for recording and/or reproducing a digital signal according to the present invention.

Referring now to FIG. 6, it will be seen that, in an embodiment of apparatus for recording and/or reproducing a digital signal according to the present invention, an analog signal, for example, an audio signal, applied to an input terminal 1 is supplied through a low pass filter (LPF) 2 to an analog-to-digital (A/D) converter 3 in which the analog signal is converted to a digital signal. The digital signal from A/D converter 3 is supplied through a fixed contact a of a switching circuit 4 to a recording signal generating circuit 5. If the switching circuit 4 is changed-over to its other fixed contact b, a digital signal applied to a terminal 6 may be directly applied to the recording signal generating circuit 5.

The recording signal generating circuit 5 carries out, on the basis of a timing signal TM from a timing signal generating circuit 7, suitable signal processing, such as, the addition of an error correction code for the data, the interleaving of the data, the modulation of the data and so on. The resulting processed digital signal is supplied from recording signal generating circuit 5 to a switching circuit 8. The switching circuit 8 is used to switch from one to the other of two rotary magnetic heads 11A and 11B in accordance with a switching signal SW1 from timing signal generating circuit 7. The switching circuit 8 is alternately switched by signal SW1 between a half-revolution period including a tape contact period of the head 11A and a half-revolution period including a tape contact period of the head 11B. The timing signal generating circuit 7 is supplied with a pulse having a frequency 33.3 Hz indicative of the rotary phases of the rotary heads 11A and 11B and which is generated from a pulse generator (not shown) in synchronism with the rotation of a motor which rotates the rotary heads 11A and 11B. The signal from switching circuit 8 which is changed-over by the switching signal SW1 from the timing signal generating circuit 7 is amplified by one or the other of amplifiers 9A and 9B and then supplied through contact R of switching circuit 10A or 10B to the rotary magnetic head 11A or 11B and thereby recorded on a magnetic tape 14 running between reels 12 and 13. The switching circuits 10A and 10B engage their contacts R in the recording mode, and engage their contacts P in the reproducing or playback mode.

Amplifiers 15A and 15B are connected to receive and amplify reproduced outputs alternately provided by the corresponding rotary heads 11A and 11B when the switching circuits 10A and 10B are engaged with their contacts P, respectively. The outputs from amplifiers 15A and 15B are supplied to respective fixed contacts of a switching circuit 16. In response to a switching signal SW2 having a frequency of 33.3 Hz and being supplied from timing signal generating circuit 7, switching circuit 16 is alternately changed-over, similarly to the action of switching circuit 8 in the recording mode, between the half-revolution period including the tape contact period of the rotary head 11A and the half-revolution period including the tape contact period of the head 11B.

The output signal SOUT from switching circuit 16 is supplied through an electromagnetic transducer system formed of an equalizer 17, a comparator 18 and a PLL (phase locked loop) circuit 19 to an error correction circuit 20 in which error correction is carried out, if necessary. The resulting signal from error correction circuit 20 is supplied to a digital-to-analog (D/A) converter 21 in which the reproduced digital signal is converted to an analog signal. The resulting analog signal from the D/A converter 21 is delivered through a low pass filter 22 to an output terminal 23 at which the reproduced analog signal is derived.

When it is desired that the digital data be directly obtained, it can be derived from a terminal 24 connected to the output of error correction circuit 20.

A sub-code micro-computer 25 serving as an interface is connected with an output of error correction circuit 20. The sub-code microcomputer 25 is used to extract the sub-code containing the program number, the time code and so on and in which the respective data are identified. A control signal C1 based on the identified data is supplied from sub-code microcomputer 25 to a system controller 26 that employs a microcomputer and is adapted to control the whole system in accordance with this invention.

The system controller 26 is provided with a plurality of switches or push buttons necessary for selecting the desired mode of operation. In FIG. 6, only a skip identifying code recording push button (SKIP ID REC) 27 and a skip on and off push button (SKIP ID ON/OFF) 28 are illustrated as being typical of such push buttons. The skip identifying code recording push button 27 is actuable to cause recording of the skip identifying code signal in the after-recording mode. The skip on and off push button 28 is displaced to its ON position when it is desired to skip the unnecessary information in the playback mode, while it is turned off when skipping of the unnecessary information is not desired even though the skip identifying code signal exists on the tape.

A drum servo circuit 30 is provided which is controlled by the system controller 26. This drum servo circuit 30 is used to control a drum motor 31 for rotating a tape guide drum (not shown) on which rotary heads 11A and 11B are mounted. A reel driving circuit 32 provides reel drive signals RD to reel motors 33 and 34 for rotating the reels 12 and 13, respectively. In response to a suitable mode switching signal MS from system controller 26, reel driving circuit 32 changes the level of drive currents that applied therefrom to reel motors 33 and 34 for controlling the operations of the latter.

A capstan servo circuit 35 is provided which is also controlled by system controller 26 and this capstan servo circuit 35 is used to control a capstan motor 37 which drives a capstan 36. For the capstan 36 there is provided a pinch roller and a conventional plunger circuit (not shown) by which movements of the pinch roller against and away from capstan 36, with the tape therebetween, ar suitably controlled.

Figure 7:
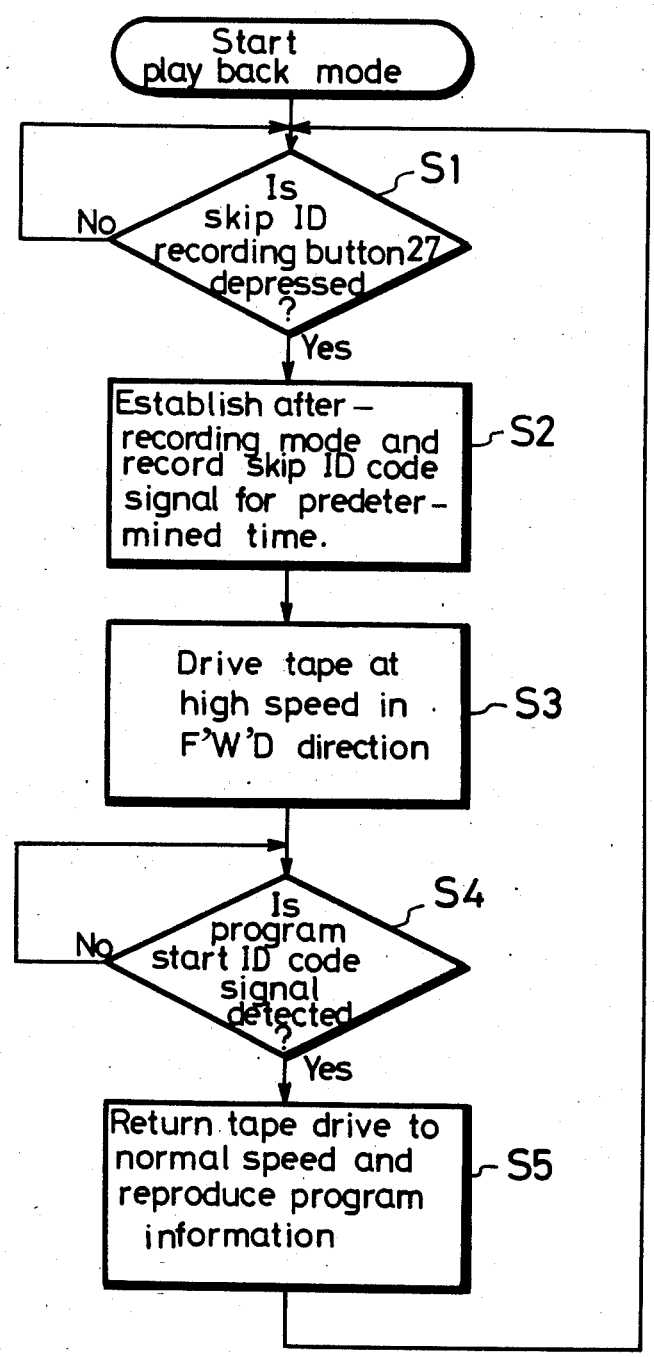
FIG. 7 is a flow chart used to explain the operation of the apparatus of FIG. 6 in recording a skip identifying code on a recording medium in accordance with the present invention.

The operation of recording the skip identifying code signal will now be described with reference to the flow chart of FIG. 7.

At first, system controller 26 is operated to place the recording and/or reproducing apparatus embodying the invention in the playback mode for reproducing the recorded information or audio signal. Thereafter, while monitoring the audio signal developed at the output terminal 23, when a portion of the audio signal that the user does not want to listen to again, that is, unnecessary program information, is heard, SKIP ID RECORDING push button 27 is depressed or actuated. When actuation of push-button 27 is detected in step 51, the recording and reproducing apparatus embodying the invention is controlled by system controller 26 so as to be placed in the after-recording mode. In the after-recording mode, the skip identifying code signal derived from recording signal generating circuit 5 is recorded by rotary heads 11A and 11B at the 3SB in the ID code of blocks in the sub-code area of tracks on magnetic tape 14 containing the start end portion of the unnecessary information. More particularly, in step S2, "1" is recorded for a predetermined time period, for example, at least, the time corresponding to the scanning of two tracks, at the 3SB of the ID code in blocks containing sub-code data.

When the recording of the skip identifying code signal is ended, reel drive circuit 32 is controlled by system controller 26 so that the magnetic tape 14 can be moved at an arbitrary high tape speed at which at least the program start signal recorded on the magnetic tape 14 can be detected (at step S3). When the program start signal is detected, that is, when the fact that the 2SB of the ID code signal recorded on the sub-code area is "1" is detected in step S4, system controller 26 controls the apparatus to return to the playback mode with the tape being driven at its normal speed so as to reproduce program information subsequent to the program start signal, as in step S5.

Next, the operation to reproduce the skip identifying code signal from the recording medium will be described with reference to the flow chart of FIG. 8.

When a play button (not shown) is depressed, the apparatus is controlled by system controller 26 so as to be placed in the playback mode. Thereafter, if the skip ID code signal on and off push button 28 is detected in step S10 to be in its ON position and, in step S20, the skip identifying code is detected in the sub-code area, that is, the 3SB of the ID code signal recorded on the sub-code area is detected to be "1", the apparatus is changed-over in step S30, from the playback mode to the high speed search mode in which the magnetic tape 14 is transported at high tape speed. In such high speed search mode, the ID code signal in the sub-code area is reproduced and, when the next program start signal is detected in step S40, that is, the 2SB of the ID code signal recorded in the sub-code area is detected to be "1", the apparatus is returned, in step S50, from the high speed search mode to the playback mode. In other words, the unnecessary information portion is skipped.

On the other hand, if skip ID code on and off push-button 28 is detected to be in its OFF position in step S10, even if the skip identifying code signal is detected in the playback mode, skipping of the respective information is not carried out, and the program information is reproduced as it is, that is, without omission or skipping.

According to the present invention as set forth above, after the skip identifying code signal relating to unnecessary information is recorded at the start end portion of the unnecessary information for a predetermined relatively short time period, the recording medium is transported at an arbitrary high speed until the next program start signal is detected, that is, until the end portion of the unnecessary information.

In other words, it is unnecessary to record the skip identifying code signal relating to the unnecessary information over the whole area of the unnecessary information as distinguished from the prior art. Thus, it becomes possible to considerably reduce the time required for recording the skip identifying code signal in the after-recording mode. Further, when it is desired to erase the skip identifying code signal, such erasure can be effected in a relatively short time. In addition, when the skip identifying code signal is detected in the playback mode, the apparatus is changed-over to the high speed (fast-forward) search mode, so that if the succeeding program start signal is searched for and then reproduced, it becomes possible to quickly find the start portion of the next program information to playback the same.

Although a single preferred embodiment of the invention has been described above with reference to the drawings, it will be apparent that the invention is not limited to that precise embodiment and that many modifications and variations could be effected therein by one skilled in the art without departing from the spirit or scope of the invention as defined in the appended claims.

What is claimed is:

1. An apparatus for recording and/or reproducing a program information signal comprising:
a recording medium on which at least a program information signal and a program start signal indicative of the start of said program information signal are recorded; transport means for controlling the transport of said recording medium; means for reproducing said program information signal recorded on said recording medium; and means for recording a skip identifying code signal indicative only of a start portion of an unnecessary program information on said recording medium.

2. The apparatus for recording and/or reproducing a program information signal according to claim 1; wherein said program start signal and said skip identifying code signal are recorded on said recording medium at a region on the latter spaced apart from a region in which said program information signal is recorded.

3. The apparatus for recording and/or reproducing a program information signal according to claim 1; further comprising: first detecting means for detecting said skip identifying code signal when a program information signal is being reproduced from said recording medium; second detecting means for detecting said program start signal; and control means for controlling said transport means such that the latter is changed from a normal transport mode to a high speed transport mode in response to detection of said skip identifying code signal by said first detecting means and said transport means is returned from said high speed transport mode to the normal transport mode in response to detection of said program start signal by said second detecting means.

* * * * *